US010642331B2

(12) United States Patent
Larosa et al.

(10) Patent No.: US 10,642,331 B2
(45) Date of Patent: *May 5, 2020

(54) ELECTRONIC DEVICE AND SENSOR DEVICE WITH LOW POWER CONSUMPTION AND RELATED METHODS

(71) Applicant: STMicroelectronics S.r.l., Agrate Brianza (IT)

(72) Inventors: Roberto Larosa, Viagrande (IT); Daniele Mangano, San Gregorio di Catania (IT); Riccardo Condorelli, Tremestieri Etneo (IT); Giulio Zoppi, Palermo (IT); Natale Aiello, Trecastagni (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 72 days.

This patent is subject to a terminal disclaimer.

(21) Appl. No.: 15/825,946

(22) Filed: Nov. 29, 2017

(65) Prior Publication Data

US 2018/0081416 A1    Mar. 22, 2018

Related U.S. Application Data

(63) Continuation of application No. 14/943,472, filed on Nov. 17, 2015, now Pat. No. 9,886,074.

(51) Int. Cl.
*G06F 1/26* (2006.01)
*G06F 1/3206* (2019.01)

(52) U.S. Cl.
CPC .............. *G06F 1/3206* (2013.01); *G06F 1/26* (2013.01)

(58) Field of Classification Search
None
See application file for complete search history.

(56) References Cited

U.S. PATENT DOCUMENTS

| | | | |
|---|---|---|---|
| 4,675,770 | A | 6/1987 | Johansson |
| 4,918,995 | A | 4/1990 | Pearman et al. |
| 7,460,025 | B2 | 12/2008 | Mellert et al. |
| 7,747,415 | B1 | 6/2010 | Churchill et al. |
| 7,908,500 | B2 | 3/2011 | Nestwick et al. |
| 8,160,654 | B2 | 4/2012 | Onishi et al. |
| 8,324,756 | B2 | 12/2012 | Dash et al. |
| 8,525,484 | B2 | 9/2013 | Lee et al. |
| 8,590,395 | B2 | 11/2013 | Ge |
| 8,723,492 | B2 | 5/2014 | Korzeniowski |
| 8,769,315 | B1 | 7/2014 | Ortiz et al. |
| 8,830,055 | B2 | 9/2014 | Lynch et al. |

(Continued)

OTHER PUBLICATIONS

Williams, J., "Understanding and Applying the LT1005 Multifunction Regulator", Linear Technology, Application Note 1, Aug. 1984, 8 pages.

*Primary Examiner* — Thomas C Lee
*Assistant Examiner* — Gary Collins
(74) *Attorney, Agent, or Firm* — Slater Matsil, LLP

(57) ABSTRACT

An electronic device may include a transducer configured to generate an electrical output responsive to an input, and a data storage element configured to change state responsive to the transducer. The electronic device may include a power circuit configured to turn on and supply power responsive to the data storage element changing state, and a processing circuit configured to be powered by the power circuit.

19 Claims, 4 Drawing Sheets

(56) References Cited

U.S. PATENT DOCUMENTS

| | | |
|---|---|---|
| 9,151,654 B2 | 10/2015 | Stenson et al. |
| 9,318,015 B2 | 4/2016 | Kates |
| 2002/0011119 A1* | 1/2002 | Bignell .................. G01F 1/667 |
| | | 73/861.23 |
| 2002/0161988 A1 | 10/2002 | Barlow et al. |
| 2004/0008188 A1 | 1/2004 | Liu |
| 2004/0078662 A1 | 4/2004 | Hamel et al. |
| 2004/0134281 A1 | 7/2004 | Pedrazzini et al. |
| 2004/0155860 A1 | 8/2004 | Wenstrand et al. |
| 2005/0017602 A1 | 1/2005 | Arms et al. |
| 2005/0104853 A1 | 5/2005 | Sitalasai et al. |
| 2005/0275528 A1 | 12/2005 | Kates |
| 2006/0059977 A1 | 3/2006 | Kates |
| 2006/0158485 A1* | 7/2006 | Hill ..................... B41J 2/04541 |
| | | 347/57 |
| 2006/0176175 A1 | 8/2006 | Evans et al. |
| 2007/0079148 A1 | 4/2007 | Pastorello et al. |
| 2007/0130479 A1* | 6/2007 | Price ........................ G06F 1/26 |
| | | 713/300 |
| 2007/0247124 A1 | 10/2007 | Mihashi |
| 2007/0284293 A1 | 12/2007 | Pitchford et al. |
| 2008/0177928 A1 | 7/2008 | Suzuki et al. |
| 2008/0250869 A1* | 10/2008 | Breed ..................... B60C 11/24 |
| | | 73/861.27 |
| 2008/0272836 A1 | 11/2008 | Smit et al. |
| 2009/0089599 A1 | 4/2009 | Westwick et al. |
| 2009/0224741 A1 | 9/2009 | Marholev et al. |
| 2010/0039234 A1 | 2/2010 | Soliven et al. |
| 2010/0066342 A1* | 3/2010 | Liao ..................... G06F 1/3203 |
| | | 323/318 |
| 2010/0205614 A1* | 8/2010 | Harrington ...... G01R 19/16576 |
| | | 719/318 |
| 2010/0223476 A1 | 9/2010 | Maletsky et al. |
| 2010/0277304 A1 | 11/2010 | Haartsen |
| 2011/0115335 A1 | 5/2011 | Pelletier |
| 2011/0154911 A1* | 6/2011 | Ge ........................... G01F 1/28 |
| | | 73/861.11 |
| 2011/0279096 A1 | 11/2011 | Lin et al. |
| 2011/0315564 A1 | 12/2011 | Guthrie et al. |
| 2012/0025948 A1 | 2/2012 | Lakamraju et al. |
| 2012/0032518 A1 | 2/2012 | Huang et al. |
| 2012/0120695 A1 | 5/2012 | Jauert |
| 2012/0223833 A1 | 9/2012 | Thomas et al. |
| 2013/0036796 A1 | 2/2013 | Fleury, Jr. et al. |
| 2013/0080081 A1* | 3/2013 | Dugger .................. G01F 1/667 |
| | | 702/48 |
| 2013/0166932 A1 | 6/2013 | Iarovici et al. |
| 2013/0328416 A1 | 12/2013 | Whitworth et al. |
| 2014/0281626 A1 | 9/2014 | Younger et al. |
| 2014/0335490 A1 | 11/2014 | Baarman et al. |
| 2015/0042300 A1 | 2/2015 | Peker et al. |
| 2016/0011235 A1 | 1/2016 | Condorelli et al. |
| 2016/0011291 A1 | 1/2016 | Condorelli et al. |

* cited by examiner

ELECTRONIC DEVICE AND SENSOR DEVICE WITH LOW POWER CONSUMPTION AND RELATED METHODS

CROSS-REFERENCE TO RELATED APPLICATIONS

This application is a continuation of U.S. application Ser. No. 14/943,472, filed on Nov. 17, 2015, which application is hereby incorporated herein by reference.

TECHNICAL FIELD

The present disclosure relates to the field of fluid flow sensors, and, more particularly, to fluid flow sensor circuitry and related methods.

BACKGROUND

Flow meters are used to measure the consumption of a metered fluid flow, such as the consumption of metered gas and water. In another application, flow meters may be installed along a fluid infrastructure, such as water lines, to detect leaks. Helpfully, these flow meters can prevent catastrophic damage from small leaks that go undetected for long periods.

With the advent of the Internet of Things, there is now a desire to couple flow meters to a network or to the Internet. So called "smart meters" are additionally able to communicate periodic readings of fluid flow over the network. Such readings must be accurate and transmission of consumption readings need only be performed periodically.

Since each smart flow meter is typically battery powered, power consumption may be an issue for some applications. In applications where a large number of smart flow meters are deployed, the need to maintenance each and every one regularly may not be desirable. Accordingly, the number of periodic readings and the frequency of the readings must be balanced with battery resources.

SUMMARY

Generally speaking, an electronic device may include a transducer configured to generate an electrical output responsive to an input, a data storage element configured to change state responsive to the transducer, and a power circuit configured to turn on and supply power responsive to the data storage element changing state. The electronic device may comprise a processing circuit configured to be powered by the power circuit. Advantageously, the electronic device may reduce power consumption (e.g. consuming only a leakage current or a negligible amount of power).

The transducer may be configured to generate the electrical output comprising an electrical pulse. The power circuit may be configured to turn on and supply power responsive to the electrical pulse. In some embodiments, the data storage element may comprise a flip flop configured to receive the electrical output and a reference voltage.

Additionally, the transducer may comprise a mechanical-to-electrical transducer. The transducer may also comprise an inductor-capacitor tank circuit. The transducer may comprise a mechanical-to-electrical sensor. The processing circuit may be coupled to an output of the mechanical-to-electrical sensor and may be configured to monitor the output when powered. Also, the electronic device may also include a wireless receiver coupled to the data storage element, and the wireless receiver may be configured to generate an electrical pulse based upon received radio frequency (RF) signals, and output the electrical pulse to the data storage element.

Another aspect is directed to a sensor device. The sensor device may include a fluid flow sensor configured to generate an electrical output responsive to a sensed fluid flow, a data storage element configured to change state responsive to the fluid flow sensor, and a voltage regulator configured to turn on and supply power responsive to the data storage element changing state. The sensor device may also comprise a processing circuit configured to be powered by the voltage regulator.

Yet another aspect is directed to an electronic device coupled to a transducer generating an electrical output responsive to an input. The electronic device may include a data storage element configured to change state responsive to the transducer, a power circuit configured to turn on and supply power responsive to the data storage element changing state, and a processing circuit configured to be powered by the power circuit.

Another aspect is directed to a method for operating an electronic device. The method may include operating a transducer to generate an electrical output responsive to an input, and operating a data storage element to change state responsive to the transducer. The method may comprise operating a power circuit to turn on and supply power responsive to the data storage element changing state, and operating a processing circuit to be powered by the power circuit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
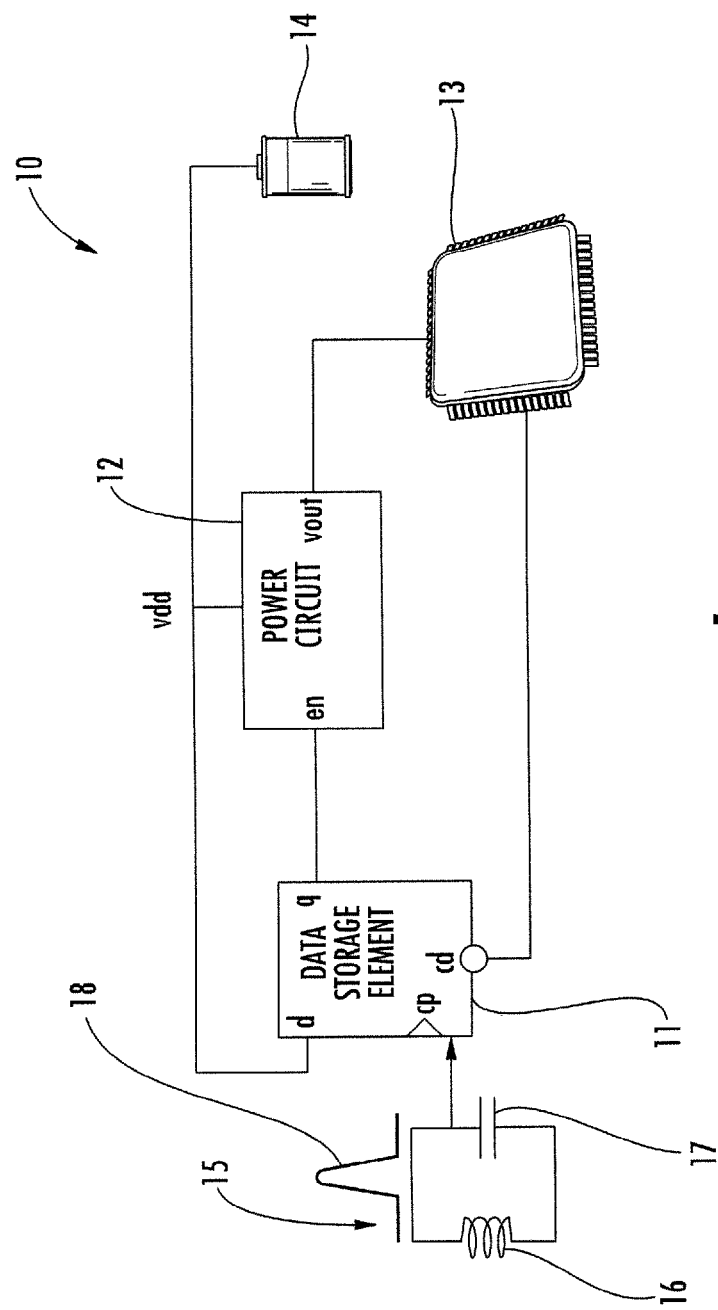
FIG. 1 is a schematic diagram of an electronic device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, an electronic device 10 according to the present disclosure is now described. The electronic device 10 illustratively includes a transducer 15 configured to generate an electrical output 18 responsive to an input. In the illustrated embodiment, the transducer 15 comprises comprise an inductor-capacitor tank circuit. In other embodiments, the transducer 15 may comprise other transducer types, such a piezoelectric transducer, an electroacoustic transducer, a thermoelectric transducer/generator, a mechanical-to-electrical transducer, a gyroscope transducer, or a mechanical-to-electrical transducer sensor.

As will be appreciated, the transducer 15 illustratively includes an inductor 16, and a capacitor 17 coupled to the inductor, defining an LC tank circuit oscillating at an operational frequency when actively powered. In this embodiment, the input is a varying electromagnetic field, which causes the electric output 18, for example, the illustrated electrical pulse. The electronic device 10 illustratively includes a battery power source 14. As discussed above, it may be desirable to conserve resources from the battery power source 14.

The electronic device 10 illustratively includes a data storage element 11 configured to change state responsive to the transducer 15. In the illustrated embodiment, the data storage element 11 comprises a flip flop configured to receive the electrical pulse 18 at a clock input and a reference voltage vdd at a data input d, the reference voltage being provided by the battery power source 14 (i.e. a constant high signal). The data storage element 11 may also comprise a latch circuit. The data storage element 11 illustratively includes a data output q.

The electronic device 10 illustratively includes a power circuit 12 configured to turn on and supply power responsive to the data storage element 11 changing state, and a processing circuit (e.g. a microcontroller unit (MCU)) 13. In some embodiments, the power circuit 12 may comprise a power switch circuit combined with the battery power source 14, or a voltage regulator (e.g. a low-dropout or LDO regulator).

The processing circuit 13 is coupled to a power output Vout of the power circuit 12 and is configured to be powered by the power circuit. The power circuit 12 is configured to turn on and supply power responsive to the electrical pulse 18, which is received at an enable input en. In the illustrated example, the power circuit 12 is enabled when the enable input goes high. The processing circuit 13 is also coupled to the clear input (i.e. clear down) cd of the data storage element 11.

During a low power mode, the power circuit 12 and the data storage element 11 receive the reference voltage vdd from the battery power source 14. The data output q of the data storage element 11 is low, so the power circuit 12 is not enabled. In this mode, power consumption is limited to the leakage current in the data storage element 11 and the power circuit 12, which is desirably low (i.e. on the order of nanoamps). The electronic device 10 maintains the low power mode until the input is detected by the transducer 15.

When the transducer 15 receives the input, the transducer generates the electrical pulse 18 at the clock input of the data storage element 11. The electrical pulse 18 causes the data storage element 11 to trigger on the data input d, which is held high by the batter power source 14. This causes the data storage element 11 to change states and change the data output q from low to high, causing the power circuit 12 to be enabled. Once enabled, the power circuit 12 powers up the processing circuit 13, which places the electronic device 10 in an operational mode. The processing circuit 13 may cause the electronic device 10 to return to the low power mode by causing the clear input cd to go low, which resets the data output q to low, thereby disabling the power circuit 12.

In some embodiments, the processing circuit 13 may operate purely based upon the battery power source 14. In these embodiments, the power circuit 12 comprises a power switch, and when the data storage element 11 changes state, the power switch couples the battery power source 14 directly to the processing circuit 13.

Another aspect is directed to a method for operating an electronic device 10. The method may include operating a transducer 15 to generate an electrical output (i.e. a pulse) 18 responsive to an input, and operating a data storage element 11 to change state responsive to the transducer. The method may comprise operating a power circuit 12 to turn on and supply power responsive to the data storage element 11 changing state, and operating a processing circuit 13 to be powered by the power circuit.

Figure 2:
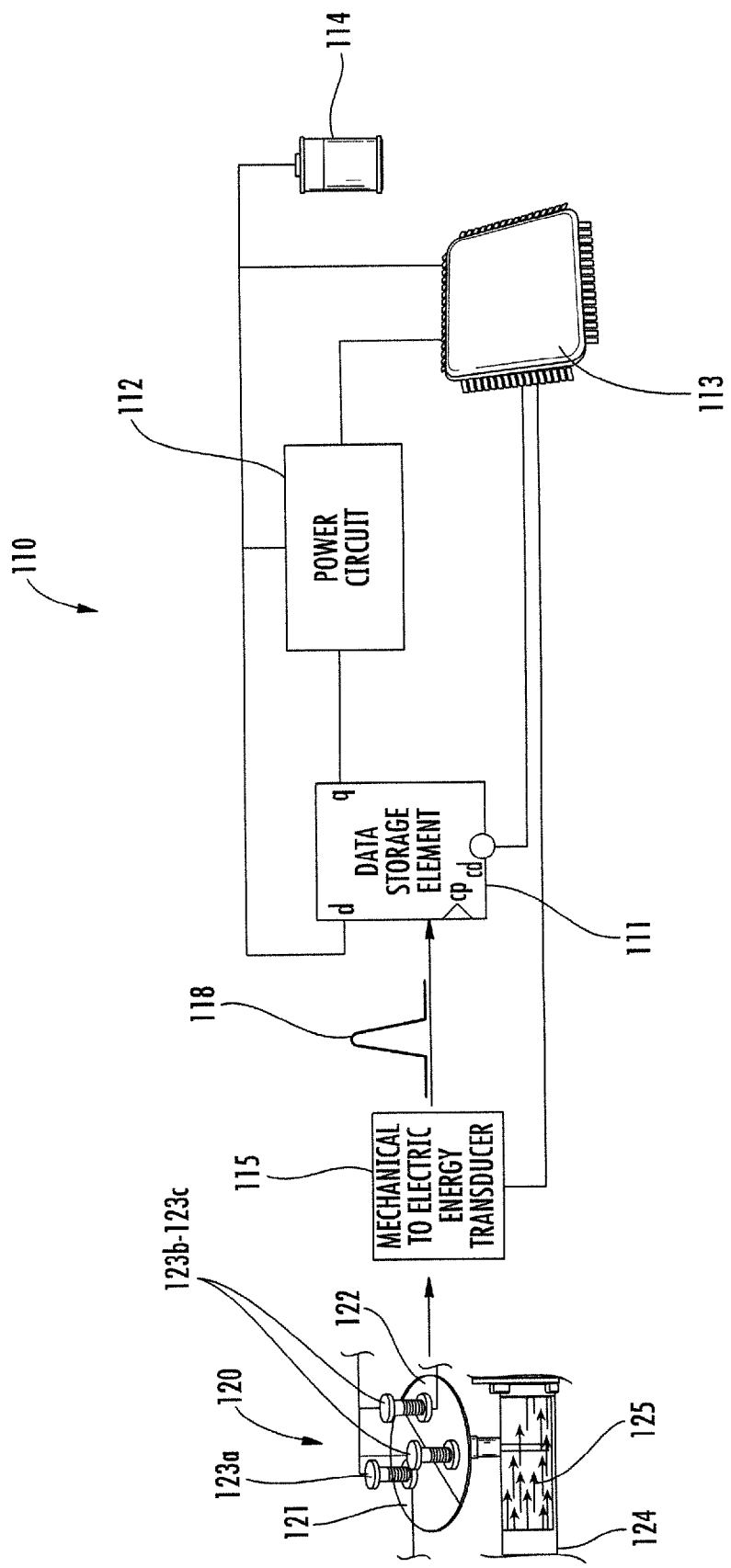
FIG. 2 is a schematic diagram of a sensor device, according to the present disclosure.

Referring now additionally to FIG. 2, another embodiment of the electronic device no is now described. In this embodiment of the electronic device 110, those elements already discussed above with respect to FIG. 1 are incremented by 100 and most require no further discussion herein. This embodiment differs from the previous embodiment in that this electronic device 110 illustratively is applied in a fluid flow sensor application, i.e. providing a sensor device. In this embodiment, the processing circuit 113 illustratively includes a direct coupling to the transducer 115.

In this embodiment, the input to the transducer 115 comprises a varying electromagnetic field, and the varying electromagnetic field is created by a fluid flow sensor 120. The fluid flow sensor 120 may comprise a sensor as disclosed in U.S. Pat. No. 8,590,395 to Ge, also assigned to the present application's assignee, the entire contents of which are hereby incorporated by reference. In this embodiment, the processing circuit 113 is configured to monitor the fluid flow sensor 120 via the transducer 115.

The fluid flow sensor 120 is configured to monitor fluid flow of a fluid (e.g. water or natural gas) 125 within a pipe 124. The fluid flow sensor 120 illustratively includes a disc comprising a first ferromagnetic semicircle 121, and a plastic second semicircle 122. The fluid flow sensor 120 illustratively includes a plurality of coils 123a-123c, which is in fixed relation, but electrically insulated from the disc. When the fluid 125 flows, the disc rotates in linear relation (i.e. increased disc rotation indicates increased fluid flow). As the disc rotates, the rotating ferromagnetic semicircle 121 causes a time varying electromagnetic field in the plurality of coils 123a-123c, which causes an electrical response.

In this application, the plurality of coils 123a-123c serves as the inductor 116 in the transducer 115. Accordingly, when in the operational mode, the processing circuit 113 is configured to continuously monitor the transducer 115, i.e. monitoring electrical response in the transducer to detect flow of the fluid 125. When the flow of the fluid 125 stops, the processing circuit 113 detects this, and when a certain timeout period has elapsed without any detected flow, the processing circuit causes the electronic device 110 to enter the low power mode, which permits the electronic device to use less power.

The electronic device 110 may include a memory (not shown) coupled to the processing circuit 113. While in the operational mode, the processing circuit 113 may store detected fluid flow data in the memory. The memory may comprise a non-volatile memory, or a volatile memory permanently coupled to the battery power source 114.

Typical fluid flow sensors are powered continuously, regardless of whether the fluid is flowing. Basically, these typical fluid flow sensors always consume power, thereby increasing the maintenance cycle (i.e. more battery replacements). Advantageously, the electronic device 110 is in the operational mode only when the fluid 125 is flowing. When there are periods of fluid flow inactivity, the electronic device 110 enters a low power mode, and awakens only when fluid flow is detected via the electrical pulse 118. The electronic device 110 provides increased battery life and reduced maintenance over typical approaches. Also, since power consumption is reduced, the electronic device 110 could also use batteries with less capacity (i.e. a total battery capacitance) and provide similar battery life as compared to typical approaches with large battery capacities, which reduces costs.

Also, in this embodiment, the battery power source 114 is coupled to a backup power input of the processing circuit 113. This backup power enables the processing circuit 113 to maintain basic time keeping functionality while without main power from the power circuit 112.

Another aspect is directed to a sensor device 110. The sensor device 110 may include a fluid flow sensor 120 configured to generate an electrical output (i.e. a pulse) 118 responsive to a sensed fluid flow, a data storage element in configured to change state responsive to the fluid flow sensor, and a voltage regulator 112 configured to turn on and supply power responsive to the data storage element changing state. The sensor device 110 may also comprise a processing circuit 113 configured to be powered by the voltage regulator 112.

Figure 3:
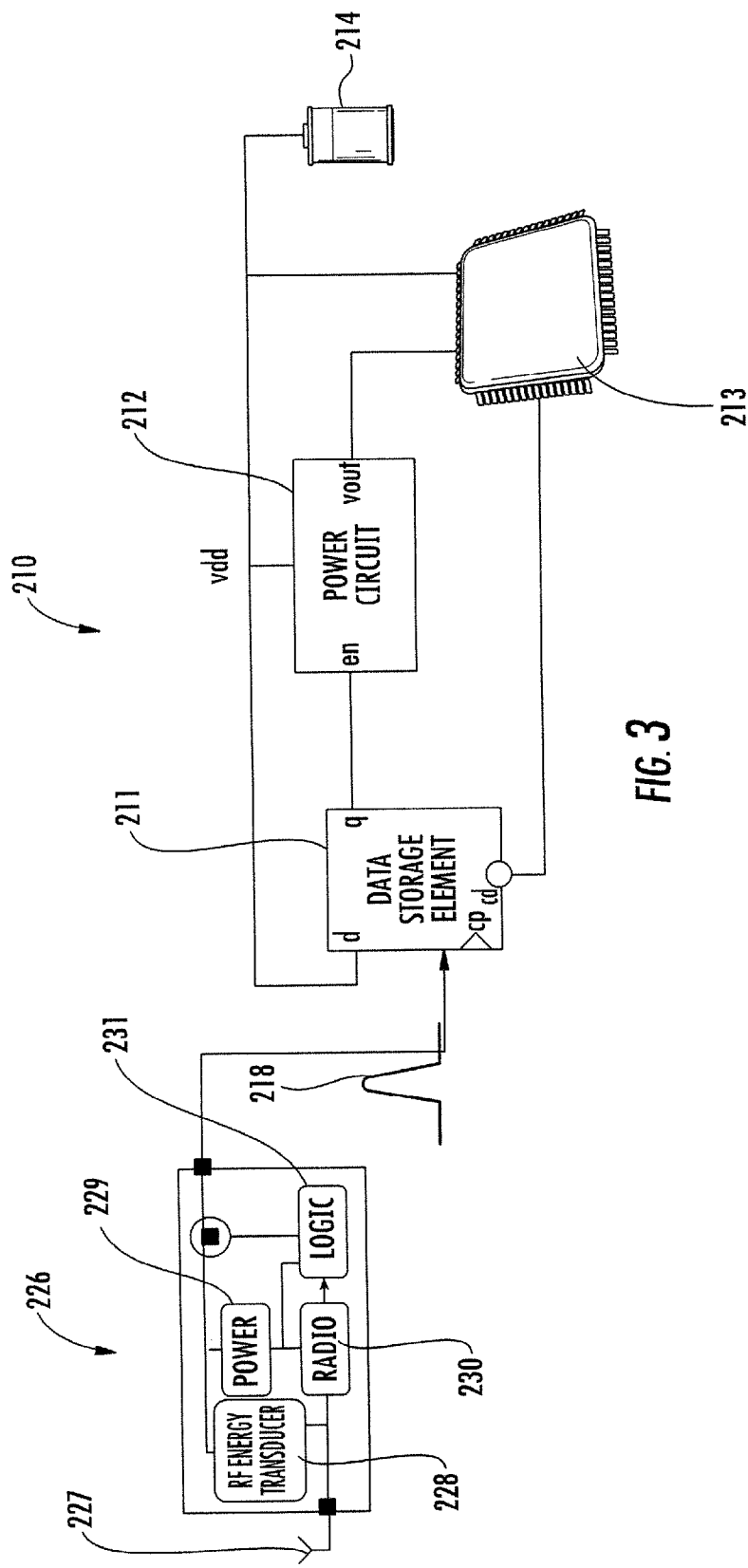
FIG. 3 is a schematic diagram of another embodiment of the electronic device, according to the present disclosure.

Referring now additionally to FIG. 3, another embodiment of the electronic device 210 is now described. In this embodiment of the electronic device 210, those elements already discussed above with respect to FIG. 1 are incremented by 200 and most require no further discussion herein. This embodiment differs from the previous embodiment in that this electronic device 210 illustratively includes a wireless receiver 226 coupled to the data storage element 211. The wireless receiver 226 illustratively includes an antenna 227 configured to receive a remote RF signal, an RF energy transducer 228 coupled to the antenna, a power circuit 229 coupled to the RF energy transducer, a radio receiver circuit 230 coupled to the antenna, and a logic circuit 231 coupled to the radio receiver circuit. The wireless receiver 226 is configured to generate the electrical pulse 218 based upon the received remote RF signals, and output the electrical pulse to the data storage element 211.

In other words, the wireless receiver 226 enables the electronic device 210 to be placed in the operational mode remotely. For example, in large network applications, such as when a large number of the sensor devices 110 of FIG. 2 are deployed to monitor sprawling fluid delivery infrastructure, each sensor device includes the wireless receiver 226, which enables the network of sensor devices to be enabled globally.

Figure 4:
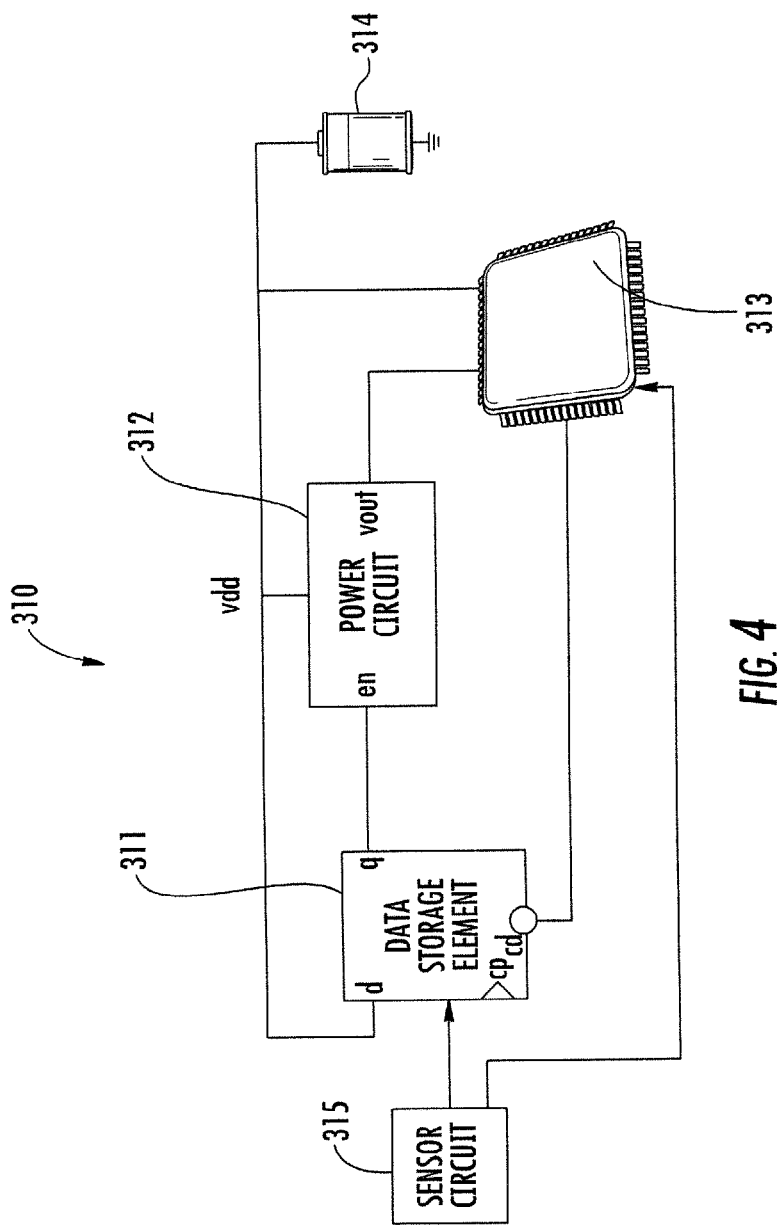
FIG. 4 is a schematic diagram of yet another embodiment of the electronic device, according to the present disclosure.

Referring now additionally to FIG. 4, another embodiment of the electronic device 310 is now described. In this embodiment of the electronic device 310, those elements already discussed above with respect to FIG. 1 are incremented by 300 and most require no further discussion herein. This embodiment differs from the previous embodiment in that this electronic device 310 illustratively includes a sensor circuit 315 serving as the transducer of the above embodiments and generating an electrical output responsive to a sensor input. For example, the sensor circuit 315 may comprise a piezoelectric sensor, an electroacoustic sensor, a thermoelectric transducer/generator/sensor, a gyroscope sensor, a motion detector sensor, a mechanical-to-electrical sensor, or a mechanical-to-electrical sensor.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

Other features relating to sensors/power circuits are disclosed in co-pending applications: titled "A METHOD OF INTERFACING A LC SENSOR AND RELATED SYSTEM," application Ser. No. 14/739,195, filed Jun. 15, 2015; and "A METHOD OF INTERFACING AN LC SENSOR AND RELATED SYSTEM," application Ser. No. 14/751,254, filed Jun. 26, 2015, all incorporated herein by reference in their entirety.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic device, comprising:
    a power source configured to generate a reference voltage;
    a data storage element comprising a first input terminal, a second input terminal, a control terminal, and an output terminal, wherein the first input terminal of the data storage element is configured to receive the reference voltage, wherein the second input terminal of the data storage element is configured to receive an electrical input signal, wherein the data storage element is configured to change state in response to reception of the electrical input signal, and wherein a first output signal is generated at the output terminal of the data storage element in response to the data storage element changing state;
    a transducer configured to generate the electrical input signal at an output of the transducer;
    a power circuit comprising a first input terminal, a second input terminal, and an output terminal, wherein the first input terminal of the power circuit is configured to receive the reference voltage, wherein the second input terminal of the power circuit is configured to receive the first output signal from the data storage element, and wherein the power circuit is configured to be enabled in response to reception of the first output signal; and
    a processor coupled to the output terminal of the power circuit and to the control terminal of the data storage element, wherein the power circuit is configured to provide power to the processor when the power circuit is enabled, wherein the processor is configured to provide a control signal to the control terminal of the data storage element to clear the first output signal, wherein, on receipt of the control signal, the first output signal is cleared at the output terminal of the data storage element and a second output signal is generated at the output terminal of the data storage element, wherein the second output signal causes the power circuit to be disabled and to cease provision of power to the processor to conserve power of the power source.

2. The electronic device of claim 1, wherein the power circuit comprises a switch, and wherein the switch is configured to provide the reference voltage to the processor when the switch is enabled.

3. The electronic device of claim 1, wherein the data storage element comprises a flip flop, and wherein the first input terminal and the second input terminal of the data storage element comprises a data input and a clock input of the flip flop, respectively.

4. The electronic device of claim 3, wherein the control terminal of the data storage element comprises a clear down input of the flip flop.

5. The electronic device of claim 1, wherein the processor is coupled to the output of the transducer, and wherein the processor is configured to monitor the output of the transducer when the processor is powered.

6. The electronic device of claim 5, wherein the processor is configured to generate the control signal after a timeout period during which the electrical input signal ceases to be present at the output of the transducer.

7. The electronic device of claim 1, wherein the processor comprises a main power input and a backup power input, wherein the power circuit is configured to provide power to main power input of the processor when the power circuit is enabled, and wherein the power source is coupled to the backup power input of the processor.

8. The electronic device of claim 1, wherein the power source comprises a battery.

9. An electronic device, comprising:
  a wireless receiver is configured to generate an electrical pulse in response to a received radio frequency signal;
  a power source configured to generate a reference voltage;
  a latch circuit comprising a first input terminal, a second input terminal, a control terminal, and an output terminal, wherein the first input terminal of the latch circuit is configured to receive the reference voltage, wherein the second input terminal of the latch circuit is configured to receive the electrical pulse from the wireless receiver, wherein the latch circuit is configured to change state in response to reception of the electrical pulse, and wherein an enable signal is generated at the output terminal of the latch circuit in response to the latch circuit changing state;
  a power circuit comprising a first input terminal, a second input terminal, and an output terminal, wherein the first input terminal of the power circuit is configured to receive the reference voltage, wherein the second input terminal of the power circuit is configured to receive the enable signal from the latch circuit, and wherein the power circuit is configured to be enabled in response to reception of the enable signal; and
  a processor comprising a first power terminal, the first power terminal of the processor being coupled to the output terminal of the power circuit, wherein the power circuit is configured to provide power to the processor via the first power terminal of the processor when the power circuit is enabled, wherein the processor is configured to provide a disable signal to the control terminal of the latch circuit to clear the enable signal, wherein, on receipt of the disable signal, the enable signal is cleared at the output terminal of the latch circuit, wherein clearing the enable signal causes the power circuit to be disabled and to cease provision of power to the processor to conserve power of the power source.

10. The electronic device of claim 9, wherein the first power terminal comprises a main power terminal of the processor, wherein the processor further comprises a backup power terminal, and wherein the backup power terminal is configured to receive the reference voltage from the power source.

11. The electronic device of claim 9, wherein the first input terminal and the second input terminal of the latch circuit comprise a data input terminal and a clock input terminal of the latch circuit, respectively.

12. An electronic device, comprising:
  a transducer configured to generate an electrical output at an output terminal of the transducer;
  a battery configured to generate power;
  a data storage element comprising a first input terminal, a second input terminal, a control terminal, and an output terminal, wherein the first input terminal is configured to receive power from the battery, wherein the second input terminal is configured to receive the electrical output of the transducer, wherein the data storage element is configured to change state in response to reception of the electrical output, and wherein an enable signal is generated at the output terminal of the data storage element in response to the data storage element changing state;
  a power circuit comprising a power terminal, an enable terminal, and an output terminal, wherein the power terminal is configured to receive power from the battery, wherein the enable terminal is configured to receive the enable signal from the data storage element, and wherein the power circuit is configured to be enabled in response to reception of the enable signal; and
  a processor coupled to the output terminal of the power circuit and to the control terminal of the data storage element, wherein the power circuit is configured to provide power to the processor when the power circuit is enabled, wherein the processor is configured to provide a control signal to the control terminal of the data storage element to clear the enable signal, wherein, on receipt of the control signal, the enable signal is cleared at the output terminal of the data storage element, wherein clearing the enable signal causes the power circuit to be disabled and to cease provision of power to the processor to conserve power of the battery.

13. The electronic device of claim 12, wherein the transducer comprises an inductor-capacitor tank circuit.

14. The electronic device of claim 12, wherein the transducer comprises a mechanical-to-electrical sensor.

15. The electronic device of claim 12, wherein the transducer comprises a fluid flow sensor.

16. The electronic device of claim 12, wherein the processor is coupled to the output terminal of the transducer, and wherein the processor is configured to monitor the output terminal of the transducer when the processor is powered.

17. The electronic device of claim 16, wherein the processor is configured to generate the control signal in response to the electrical output ceasing to be present at the output terminal of the transducer for at least a timeout period.

18. The electronic device of claim 12, wherein the data storage element comprises a flip flop.

19. The electronic device of claim 12, wherein the power circuit comprises a switch, and wherein the switch is configured to provide the power from the battery to the processor when the switch is enabled.

* * * * *